United States Patent [19]

Westervelt et al.

[11] 4,006,083
[45] Feb. 1, 1977

[54] PRESSURE DIFFERENTIAL SWITCH

[75] Inventors: Ralph Westervelt, Pekin; Lawrence F. Fratzke, East Peoria, both of Ill.

[73] Assignee: Caterpillar Tractor Co., Peoria, Ill.

[22] Filed: Oct. 9, 1975

[21] Appl. No.: 620,998

[52] U.S. Cl. .................................. 210/90; 116/70; 116/117 R; 200/83 N; 200/83 P; 210/111
[51] Int. Cl.² ........................................ B01D 35/14
[58] Field of Search ........................ 116/70, 117 R; 200/83 N, 83 P; 210/85, 90, 97, 111

[56] References Cited

UNITED STATES PATENTS

| | | | |
|---|---|---|---|
| 2,338,750 | 1/1944 | Winton | 200/83 N |
| 2,477,801 | 8/1949 | Hathaway | 200/83 N |
| 2,671,893 | 3/1954 | Van Scoy et al. | 200/83 N |
| 2,692,684 | 10/1954 | Hallinan | 210/443 |
| 2,798,129 | 7/1957 | Reese et al. | 200/83 N |
| 2,839,630 | 6/1958 | Wood | 200/83 N |
| 3,119,437 | 1/1964 | Roosa | 200/83 N |
| 3,164,164 | 1/1965 | Pall et al. | 210/90 X |
| 3,196,974 | 7/1965 | Barnes, Jr. | 200/83 N |
| 3,331,509 | 7/1967 | Gray, Jr. | 210/90 |
| 3,395,802 | 8/1968 | Rosaen | 210/90 |
| 3,423,552 | 1/1969 | Sipin | 200/83 P |
| 3,689,719 | 9/1972 | Phillips et al. | 200/83 N X |
| 3,845,260 | 10/1974 | Lohr | 200/83 N |
| 3,947,648 | 3/1976 | Muterel | 116/70 X |

Primary Examiner—Charles N. Hart
Assistant Examiner—R. G. Mukai
Attorney, Agent, or Firm—Wegner, Stellman, McCord, Wiles & Wood

[57] ABSTRACT

Apparatus for indicating a clogged condition of a fluid filter or the like. The apparatus includes an electrical switch structure and a pressure-responsive element carried within the chamber to be responsive to the fluid pressure differential existing across the filter. The switch includes a threaded screw element adapted to adjustably engage the fluid pressure-responsive element in the chamber which may comprise a snap action element providing a positive instantaneous indication of the pressure across the filter reaching the preselected elevated value indicative of undesirable clogging of the filter.

12 Claims, 1 Drawing Figure

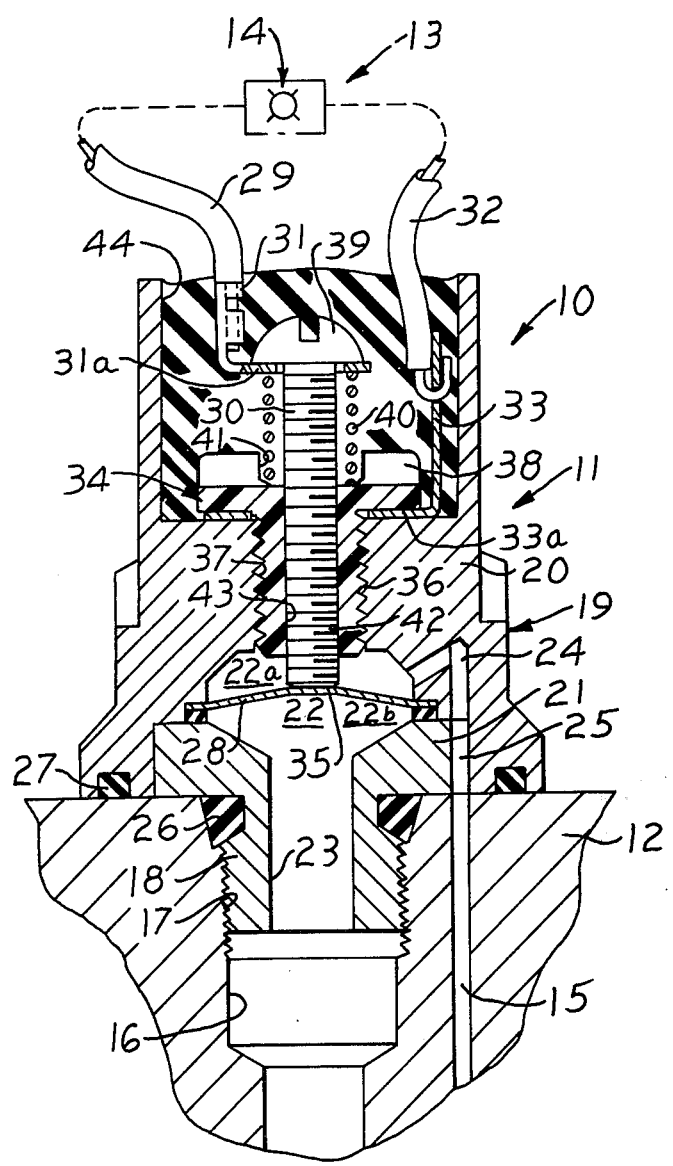

PRESSURE DIFFERENTIAL SWITCH

BACKGROUND OF THE INVENTION

1. Field of the Invention

This invention relates to fluid control systems and in particular to apparatus for indicating the condition of a fluid filter provided in such systems.

2. Description of the Prior Art

In U.S. Pat. No. 2,678,134 of Frank Middleton, owned by the assignee hereof, a filter indicating device is shown wherein a gauge is provided communicating the discharge from the filter with a vent passage to atmosphere. Valve means are provided for normally closing the vent passage and actuated by a predetermined differential fluid pressure across the filter to admit atmospheric pressure to the gauge thereby indicating the clogged condition of the filter.

In James E. Scheidt U.S. Pat. No. 3,358,835, owned by the assignee hereof, a filter condition indicator is shown to comprise a window in a tank associated with the filter system. A piston in the tank is visible through the window. Means are provided for communicating tank pressure and a low spring force to one end of the piston and for communicating return line pressure to the opposite end of the piston. The piston is provided with an indicating means which is viewable through the window when the piston is moved by an increase in the return line pressure to a preselected undesirable high level.

In U.S. Letters Patent of James L. Schmitt, U.S. Pat. No. 3,358,836, also owned by the assignee hereof, a filter element indicator is shown to comprise a dual reading filter condition indicator for indicating either a clogged or ruptured filter element. The indicator includes a body having transparent portions at opposite ends of a passage therethrough. A plunger means in the passage is selectively moved away from or toward the windows to provide the desired filter condition indication.

In U.S. Pat. No. 2,729,339 of Marion M. McCoy, a temperature responsive means is provided for detecting a clogged filter condition. The electrical circuit associated with the apparatus is operated only when the liquid flowing through the filter has been warmed to the usual engine operating temperature. The contact member comprises a bimetallic element which flattens out when heated to permit the clogged condition indication and which remains in a curved condition when unheated so as to prevent indication of the clogged filter element.

SUMMARY OF THE INVENTION

The present invention comprehends an improved indicating apparatus for indicating a clogged condition of a fluid filter. The apparatus includes housing means defining a chamber, electrically conductive snap-action wall means extending across the chamber dividing the chamber into a first portion and a second portion, means for providing fluid communication between the first chamber portion and the filter inlet, means for providing fluid communication between the second chamber portion and the filter outlet, the wall means being self-biased toward a normal position projecting toward the first chamber portion, contact means, insulating means carrying the contact means to have normally closed electrical engagement with the wall means, circuit means having a first portion electrically connected to the contact means, and a second portion electrically connected to the wall means, the wall means being arranged to snap away from the contact means to open the circuit between the first and second circuit portions when the differential fluid pressure between the first and second chamber portions reaches a preselected elevated value, and means responsive to the opening of the circuit to indicate the reaching of the elevated pressure.

The contact means may be adjustable mounted on the insulating means.

In the illustrated embodiment, the first circuit portion and the wall means are electrically connected to the housing.

The wall means may comprise a conical spring member and the contact means is arranged to stress the wall means toward the second chamber portion to provide an adjustable calibration of the apparatus. The adjustment of the contact means may be provided by threaded means associated therewith, and more specifically, in the illustrated embodiment, the contact means comprises a screw adjustably threaded through the insulating means. The insulating means may comprise a spool coaxially threaded into the housing means. The insulating means may include a clamp portion clamping the second portion of the electrical circuit to the wall means. Biasing means may be provided engaging the insulating means and urging the first portion of the electrical circuit means into electrical engagement with the contact means.

The housing may comprise a pair of interfitted elements cooperatively defining the sensing chamber.

The electrical terminals of the circuit means and an outer portion of the contact means may be potted with suitable sealing compound to provide weather and contaminant resistance.

Thus, the indicating apparatus of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein the FIGURE is a diametric section of an indicating apparatus embodying the invention mounted to a filter base.

DESCRIPTION OF THE PREFERRED EMBODIMENT

In the exemplary embodiment of the invention as disclosed in the drawing, an indicating apparatus generally designated 10 is shown to comprise a switch generally designated 11 adapted to be mounted to a filter base 12, or the like, and connected to circuit means generally designated 13 including an indicator, such as indicating lamp 14, or the like, for indicating a clogged condition of the filter. In the illustrated embodiment, the filter base includes a dirty oil passage 15 and a clean oil passage 16. The clean oil passage may define a threaded outer portion 17 for receiving a threaded portion 18 of switch 11.

Switch 11 defines a housing generally designated 19 including an upper portion 20 and a lower portion 21. The housing portions are integrally secured and cooperatively define a chamber 22. The lower housing portion is provided with a passage 23 opening to the bottom of chamber 22 and to the filter clean oil passage 16. Upper housing portion 20 defines a passage 24 opening to an upper portion of chamber 22 and to a connecting passage 25 in lower housing portion 21 which communicates with the dirty oil passage 15 of the filter when switch 11 is installed thereon, as shown in the drawing. Suitable O-rings 26 and 27 may be provided in housing portions 20 and 21, respectively, for sealing the switch to the filter body.

Chamber 22 is divided into an upper portion 22a and a lower portion 22b by a snap-action wall means 28 which may comprise a generally conical disc formed of suitable spring material. In its unbiased position, disc 28 projects upwardly toward chamber portion 22a. Downward pressure, however, on the disc may snap it downwardly to the dotted line position so as to cause the disc to project reversely downwardly toward chamber portion 22b. Such action may be effected by the pressure differential of the fluid acting on chamber portions 22a and 22b and, thus, the snap position of the switch indicates a preselected elevated pressure differential such as may correspond to an undesirable clogged condition of the filter. The switch is self-biasing so as to return to the full line position of the drawing upon decrease of the pressure differential to below the preselected level whereby the switch is a resetting switch in normal operation.

The electrical circuit 13 includes a first wire 29 electrically connected to a contact element 30 by a terminal 31 and a second wire 32 electrically connected to the housing portion 20 by a terminal 33. Contact member 30, in the illustrated embodiment, comprises a screw threaded through a T-shaped insulating spool element 34 so as to have a lower end 35 thereof in electrical engagement with the disc 28. Spool element 34 may be provided with a threaded shank portion 36 threaded through a threaded bore 37 in housing portion 20 opening downwardly to upper chamber portion 22a. Head 38 of the spool element is arranged to clamp a turned end 33a of terminal 33 against housing portion 20. Housing portion 20 may be grounded through wire 32 to define the ground portion of electrical circuit 13.

Terminal 31 of wire 29 may be urged into good electrical contact with the head 39 of screw 30 by a coil spring 40 engaging a turned end portion 31a of terminal 31. The lower end of spring 40 may be received in a spring retaining recess 41 in head 38 of insulator spool 34.

In assembling switch 11, the threaded shank 42 of screw contact element 30 is threaded through a threaded axial bore 43 of the spool element to provide an adjustable engagement force of end 35 with the snap spring disc 28, thereby to calibrate the switch for the desired pressure range.

Housing portion 20 further defines an upwardly opening outer recess 44 in which the terminals 31 and 33, the head 38 of the insulator spool 34, the upper end of the screw contact member 30, and the spring 40 are disposed. Upon completion of the calibration of the switch adjustment of screw contact member 30, the recess 44 may be filled with suitable potting, or sealing, compound to hermetically seal and protect the circuit elements therein against weather and contaminants. Thus, the apparatus 10 is advantageously adapted for use with vehicles and the like where adverse operating conditions may prevail.

In the operation of apparatus 10, spring disc 28 remains in engagement with contact member 30 as long as the pressure differential acting between chamber portions 22a and 22b is below the preselected calibrated value. Thus, a circuit is completed from wire 29 through contact member 30, spring disc 28, and housing portion 20 to wire 32. Circuit means 13 is arranged so as to cause indicator 14 to indicate the satisfactory condition of the filter under these conditions.

However, when the pressure differential increases, such as by a clogged condition of the filter 12, the snap-action disc 28 snaps to the dotted line position of the drawing opening the circuit between wires 29 and 32 whereby circuit means 13 may cause the indicator 14 to indicate the clogged condition of the filter.

Apparatus 10 is extremely simple and economical of construction while yet providing an improved positive filter condition indication. The apparatus is adapted for long maintenance-free use under adverse conditions.

The foregoing disclosure of specific embodiments is illustrative of the broad inventive concepts comprehended by the invention.

We claim:

1. In an apparatus for indicating a clogged condition of a fluid filter having an inlet and an outlet; electrically conductive housing means defining a chamber, electrically conductive snap-action wall means extending across said chamber dividing the chamber into a first portion and a second portion, said wall means being electrically connected to said housing, means for providing fluid communication between said first chamber portion and the filter inlet, means for providing fluid communication between said second chamber portion and the filter outlet, said wall means being self-biased toward a normal conical disposition projecting toward said first chamber portion, contact means, insulating means threaded to said housing and carrying said contact means to have normally closed electrical engagement with said wall means, the improvement comprising circuit means having a first portion electrically connected to said contact means, and a second portion retained in electrically connected engagement with said housing by said insulating means, said wall means being prestressed by said contact means and arranged to snap away from said contact means to open the circuit between said first and second circuit portions when the differential fluid pressure between said first and second chamber portions reaches a preselected elevated value; and means responsive to the opening of the circuit to indicate the reaching of said elevated pressure.

2. The filter condition switch of claim 1 wherein means are provided for adjustably mounting said contact means on said insulating means.

3. The filter condition switch of claim 1 wherein said wall means comprises a unitary spring member.

4. The filter condition switch of claim 1 wherein said insulating means comprises a spool member having an enlarged head engaging said circuit means second portion.

5. The filter condition switch of claim 1 wherein said insulating means comprises a spool member adjustably threaded through said housing means.

6. The filter condition switch of claim 1 wherein said insulating means comprises a spool member having a clamp portion clamping said wall means to provide said electrically connected engagement.

7. The filter condition switch of claim 1 including spring means engaging said insulating means and urging said first portion of the electrical circuit means into electrical engagement with said contact means.

8. The filter condition switch of claim 1 wherein said contact means are disposed to stress said wall means toward said second chamber portion while maintaining a conical configuration thereof.

9. The filter condition switch of claim 1 wherein said housing comprises a pair of interfitted housing elements cooperatively defining said chamber.

10. The filter condition switch of claim 1 wherein said housing defines an outwardly opening recess and said first and second circuit portions include terminals received in said recess, said recess being filled with sealing compound about said terminals.

11. The filter condition switch of claim 1 wherein said housing defines an outwardly opening recess and said first and second circuit portions include terminals received in said recess, said contact means including an outer portion disposed in said recess, said recess being filled with sealing compound about said terminals and said contact means outer portion.

12. The filter condition switch of claim 1 wherein said contact means and insulating means comprise coaxial externally threaded elements.

* * * * *